United States Patent
Petschauer et al.

[11] Patent Number: 6,089,550
[45] Date of Patent: Jul. 18, 2000

[54] MASS TRANSFER PROCESS

[75] Inventors: Frank J. Petschauer, Mayfield Heights; Richard P. Hauser, Ravenna; Frank Rukovena, Tallmadge, all of Ohio

[73] Assignee: Norton Chemical Process Products Corporation, Stow, Ohio

[21] Appl. No.: 09/158,222

[22] Filed: Sep. 22, 1998

[51] Int. Cl.⁷ .................................. B01F 3/04
[52] U.S. Cl. .................. 261/113; 95/213; 202/158
[58] Field of Search ............... 261/113, 114.3, 261/114.4, 114.5; 95/213, 221, 222; 96/296, 299; 202/158

[56] References Cited

U.S. PATENT DOCUMENTS

| | | | |
|---|---|---|---|
| 3,029,070 | 4/1962 | Koch | 261/114.4 X |
| 3,156,746 | 11/1964 | Kittel | 261/114.3 |
| 3,445,095 | 5/1969 | Braun et al. | 261/114.4 |
| 3,489,506 | 1/1970 | Galstaun et al. | 261/113 X |
| 3,717,553 | 2/1973 | Otsuki et al. | 261/114.3 X |
| 3,940,462 | 2/1976 | Braun et al. | 261/114.4 |
| 4,004,609 | 1/1977 | Fabry et al. | 261/114.4 X |
| 4,098,579 | 7/1978 | Starzycki et al. | 261/114.4 X |
| 4,820,455 | 4/1989 | Kunesh et al. | 261/113 X |
| 5,147,584 | 9/1992 | Binkley et al. | 261/114.3 |
| 5,360,583 | 11/1994 | Nutter | 261/114.3 |

FOREIGN PATENT DOCUMENTS

| | | | |
|---|---|---|---|
| 2227280 | 12/1972 | Germany | 261/114.4 |
| 54-17312 | 6/1979 | Japan | 261/114.3 |
| 55-41121 | 10/1980 | Japan | 261/114.5 |

*Primary Examiner*—Richard L. Chiesa
*Attorney, Agent, or Firm*—David Bennett

[57] ABSTRACT

A dual flow mass transfer process is provided which employs a dual flow mass transfer tray having perforations, at least some of which are provided with vapor flow deflectors to deflect the flow of vapor rising through the perforations to give the vapor flow an increased horizontal component.

1 Claim, 2 Drawing Sheets

MASS TRANSFER PROCESS

BACKGROUND OF THE INVENTION

This invention relates to chemical processes in which a liquid is contacted with a counterflow of gas. This may be for a variety of purposes such as stripping a component from the liquid stream or absorbing a component into a liquid stream. More generically this invention relates to mass transfer processes which term is understood to refer to mass and/or heat transfer between gas and liquid phases.

The processes to which this invention specifically relates employ dual-flow fractionation trays in which a liquid passes through perforations in the tray deck in the downward direction while vapor passes upwardly through the same perforations. Such bi-directional flow is avoided in conventional mass transfer trays by the provision of devices to inhibit downward flow of liquid through the perforations.

In processes that use dual flow devices, a tower is provided with a plurality of fractionation trays arranged generally horizontally within the tower. In the process a gas or vapor is introduced at the base of the tower and passes upwards through the perforations in the decks of the fractionation trays. Meanwhile a liquid is introduced at the top of the tower and percolates downward passing through the same perforations in the fractionation trays to the tray below.

Dual flow trays are not provided with downcomers to conduct liquid and vapor/liquid foams down to the next lower level as is the case with conventional valved-perforation, (or "cross-flow"), trays. In such trays a horizontal flow direction across the surface of the tray is established by the location of the downcomer and this aids in producing efficient vapor/liquid contact. Cross-flow trays are therefore quite different in operation and essential design criteria.

The key to efficient operation of a dual flow process is the balancing of the tray pressure drop such that the upward-flowing gas/vapor does not overwhelm the downward-flowing liquid thereby providing efficient contact between liquid and vapor. At the same time care must be taken to ensure that downflowing liquid does not establish a stream which would pass directly down through the perforations to the tray below, thus by-passing the gas/vapor.

In a conventional dual flow process the balance is sought by controlling the size and number of perforations in the tray deck. However this is not an approach that promotes good contact between vapor and liquid, especially if the vapor flow is near the minimum extreme of the permitted designed pressure range. It also limits the range of flow conditions over which the process can function efficiently.

It has now been found that dual flow processes can be designed that permit efficient operation over a wide range of vapor rates while offering minimal added resistance to flow in either direction.

The present invention provides a dual flow mass transfer process using a simple gas/liquid perforated tray device that can easily be installed and which provides a highly effective means of contacting liquid flowing down through perforations in the tray with gas flowing up through the perforations.

GENERAL DESCRIPTION OF THE INVENTION

The present invention provides a dual flow mass transfer process which comprises:

a) providing a tower having at least one perforated mass transfer tray located therein wherein the perforations provide the exclusive means of communicating between the space above the tray and the space below;

b) passing a gas up the tower such that the gas passes through the perforations in the tray while at the same time causing a liquid to flow down through tower and pass through the perforations in the tray; and c) providing vapor flow deflectors supported above the level of the tray surface and over at least some of the perforations such that vapor flowing upwards through the perforation is deflected from a vertical path to a path with a horizontal component.

While the vapor flow deflector also has the function of preventing liquid from passing directly through the perforation without contacting the tray surface, its primary function is to ensure that vapor passing upwards through the perforation has a longer and more effective contact with the downflowing liquid. When a liquid falls on to the surface of a dual flow tray, it spreads horizontally and thus, while there may be no dominant flow direction, the liquid is pooled, agitated and mixed on the tray surface until it exits through the perforations. Compelling the vapor flow to move with a horizontal motion component lengthens the time during which the vapor contacts the liquid and hence the mass transfer efficiency of the tray. Such horizontal deflection of the vapor flow is important since it promotes more uniform bubbling action across the entire tray area. At the same time the operating range and the hydraulic capacity of the tray is significantly increased.

The shape of the vapor flow deflector can be extremely simple such as a flat plate that is supported parallel to and above the tray surface with dimensions at least equivalent to those of the perforation that it covers. One way to form such deflectors is to make parallel cuts in the tray material and deform the portion between the cuts upwardly out of the plane of the tray surface. It is however often desirable to provide that the flow deflector is slightly larger than the perforation to increase the degree of horizontal deflection to the vapor flow. The vapor flow deflector can also have a fluted structure with radial fluting encouraging the creation of stronger local vapor flows radially outward from the perforation.

The vapor flow deflector is supported above the level of the tray surface and the height above the tray is determined largely by the design flow rates for the tray. Placing the deflector too far above the tray will reduce its deflecting capabilities but will provide less impedance to the upward and downward flows. However placing the deflector too close to the tray surface increases the effectiveness of the vapor/liquid contact but decreases the actual flow rate through the perforations. Generally the vapor flow deflector is located from 4 mm to 25 mm, and preferably from 6 mm to 20 mm above the tray surface.

The vapor flow deflector can be supported on any convenient number of legs. Generally these are as few and as slender as possible to minimize the impedance to the flow of vapor or liquid. The shape is also preferably streamlined or at least round to minimize the creation of dead or inactive spots on the tray surface. Optionally and alternatively the legs may be arranged at various angles to direct vapor flow over the whole of the tray surface so as to avoid creation of inactive areas. In general two legs give adequate dimensional stability with acceptable interference with free flow conditions.

The problem of inactive areas associated with the support legs for the vapor flow deflector can also be addressed by appropriate positioning of adjacent perforations on the tray. As an example of this approach, it is possible to provide that the up-flowing vapor be diverted or deflected towards the area behind the support legs of the vapor flow deflector of an adjacent perforation. In this way liquid flowing into the space behind a support leg will be swept by a vapor flow from at least one and possibly two adjacent covered perforations thus promoting effective mass transfer.

In some cases it may be possible to provide a single vapor flow deflector structure over a number of perforations located in a row. Such a single deflector structure can comprise for example a pair of parallel horizontal support rods anchored at each end to the tray deck and running on either side of a line of perforations in a tray deck. In such a structure individual deflectors connect the support rods in locations corresponding to the perforations in the tray deck such that the degree of interference with liquid or vapor flow by the vapor flow deflector support structures is minimized.

DRAWINGS

FIG. 1 is a plan view of a dual flow tray useful in the process of the invention while

DETAILED DESCRIPTION OF THE INVENTION

The invention is now further described with reference to the Drawings which are intended to illustrate the invention but are not to be understood as implying any essential limitations on the scope of the invention.

Figure 1A:
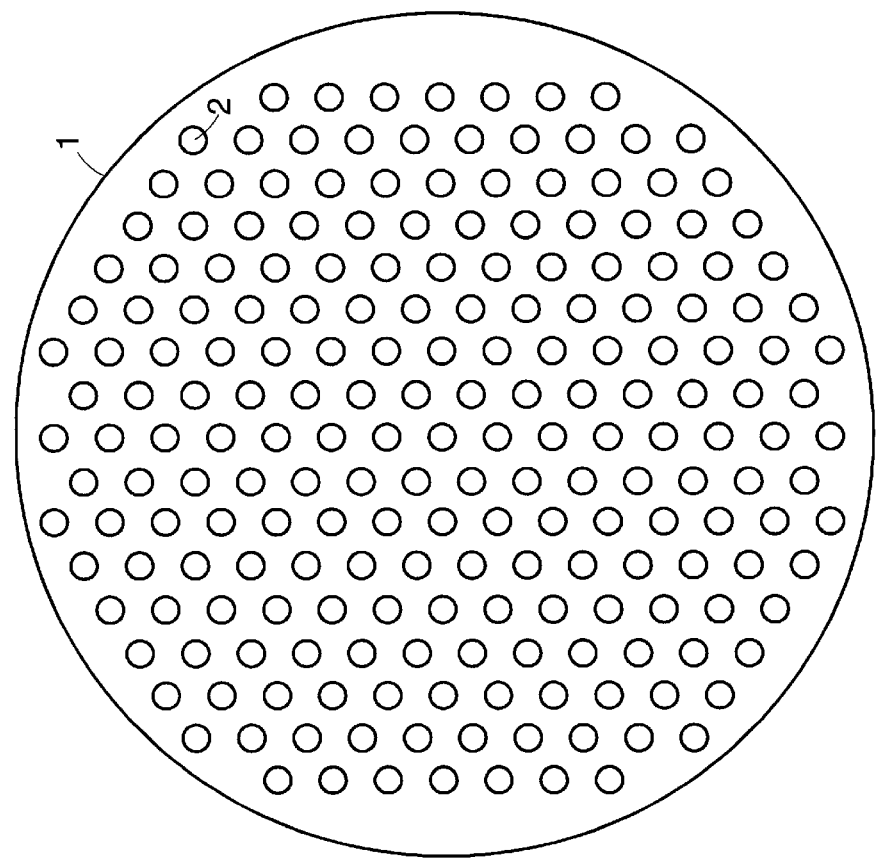
FIG. 1(a) shows a similar view of a prior art dual flow tray.
Figure 1:
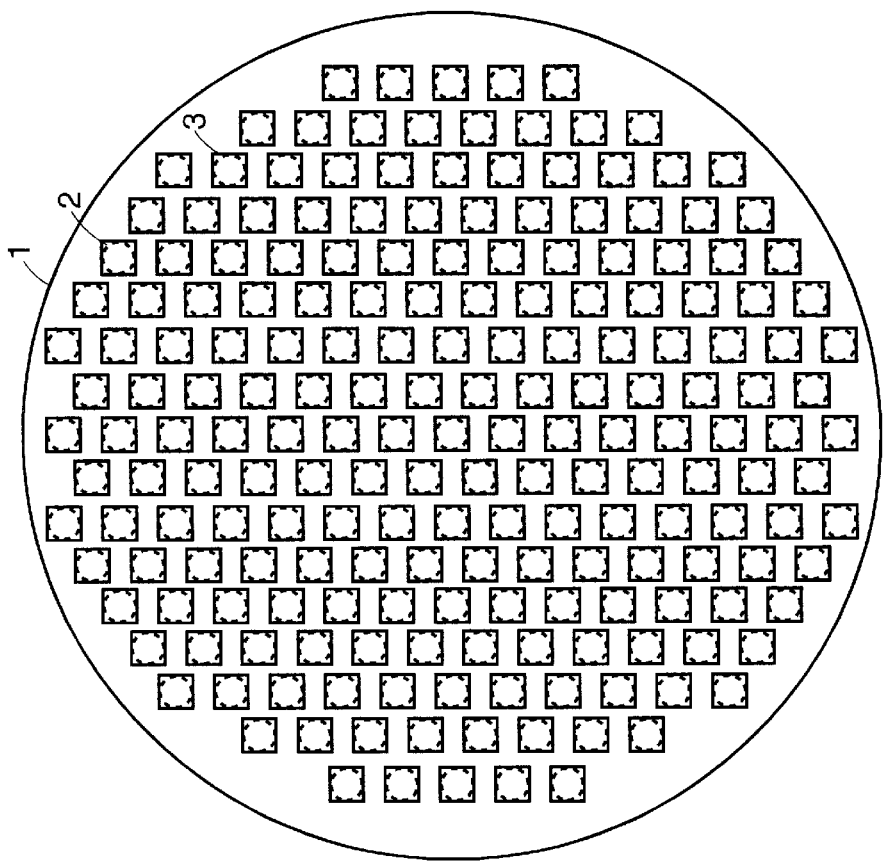

FIG. 1 shows a dual flow tray suitable for use in the process of the invention. The tray, 1, is provided with perforations, 2, with horizontal vapor flow deflectors, 3, located over the perforations.

FIG. 1A shows a conventional dual flow tray according to the prior art. This tray comprises the perforations, 2, in the tray, 1, but lacks the vapor flow deflectors.

Figure 2A:
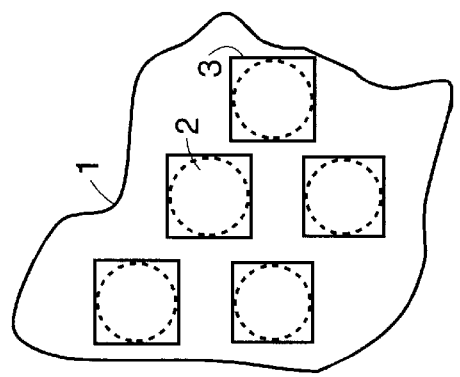
FIGS. 2 and 2A are cross-section and plan views respectively of a first design for perforations having associated vapor flow deflectors for use in the process of the invention.
Figure 2:
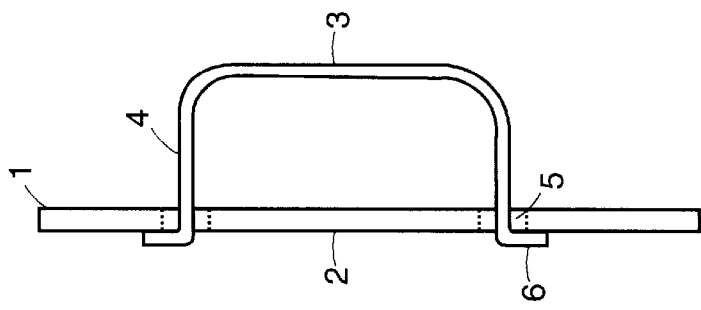

FIG. 2 shows a tray, 1, having a perforation, 2, and a vapor flow deflector comprising an essentially horizontal portion, 3, supported on legs, 4, which pass through slots, 5, in the tray and terminate in anchoring tabs, 6, which bear against the underside of the tray. FIG. 2A shows a plan view of a portion of a tray having a plurality of the covered perforations shown in FIG. 2. As will be observed, the vapor flow deflector is larger than the perforation and adjacent perforations are located to ensure that no dead spots develop behind the support legs of the deflector.

The relative sizes of the perforation and the deflector can be optimized to suit the design flow conditions and this flexibility is an important feature of the present invention. The vapor flow deflector as shown has two legs located at the middle of opposed sides of the deflector. However the provision of four narrow legs located one at each corner of a rectangular deflector, each with its own cooperating slot and tab portion, is an attractive alternative from the point of view of minimizing inactive areas.

Figure 3A:
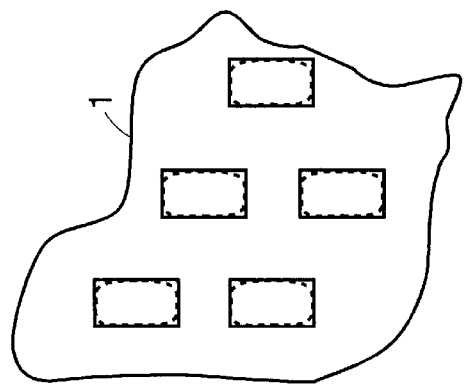
FIGS. 3 and 3A are cross-section and plan views respectively of an alternative design to that illustrated in FIGS. 2 and 2A.
Figure 3:
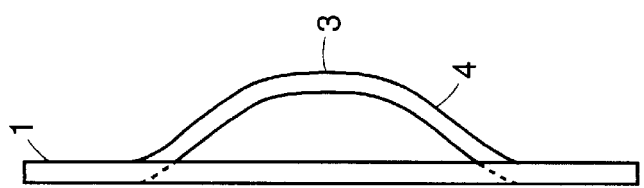

FIGS. 3 and 3A show cross-section and plan views corresponding to those in FIGS. 2 and 2A wherein the vapor flow deflector is formed by deforming the material of the tray between a pair of parallel slits made in the tray body. The same features of horizontal vapor flow deflector and support legs are present and the deformation leaves a perforation whose dimensions are determined by the dimensions of the deflector and support legs.

As will be appreciated from a consideration of the positioning of the covered perforations in FIGS. 2A and 3A, up-flowing vapor passing through one line of perforations is deflected sideways such that it passes into the space behind the support legs of the covers associated with adjacent lines of perforations on either side. This of course will minimize any "dead" or inactive vapor/liquid contact areas on the surface of the tray thereby increasing its efficiency.

What is claimed is:

1. A mass transfer process which comprises:
    a) providing a tower having at least one perforated mass transfer tray located therein wherein the perforations provide the exclusive means of communicating between the space above the tray and the space below;
    b) passing a gas up the tower such that the gas passes through the perforations in the tray while at the same time causing a liquid to flow down through the tower and pass through the same perforations; and
    c) providing individual vapor flow deflectors supported and maintained a fixed distance above the level of the tray surface over each of at least some of the perforations, wherein each deflector is larger than the perforation that it covers such that vapor flowing upwards through such perforations is deflected from a vertical path to a path with a horizontal component, and wherein the perforations covered by individual deflectors are located in rows and the up-flowing vapor is directed by the deflectors associated with a first row of perforations into the areas between perforations in adjacent rows.

* * * * *